(12) United States Patent
Roberts et al.

(10) Patent No.: US 9,909,676 B2
(45) Date of Patent: Mar. 6, 2018

(54) AUTOMATIC SHUT-OFF DEVICE

(71) Applicants: Logan Roberts, Tempe, AZ (US); Bryn Prinsloo, Mesa, AZ (US)

(72) Inventors: Logan Roberts, Tempe, AZ (US); Bryn Prinsloo, Mesa, AZ (US)

(*) Notice: Subject to any disclaimer, the term of this patent is extended or adjusted under 35 U.S.C. 154(b) by 0 days.

(21) Appl. No.: 14/944,125

(22) Filed: Nov. 17, 2015

(65) Prior Publication Data
US 2016/0069463 A1 Mar. 10, 2016

Related U.S. Application Data

(63) Continuation-in-part of application No. 14/098,998, filed on Dec. 6, 2013, now Pat. No. 9,222,589.

(60) Provisional application No. 61/806,624, filed on Mar. 29, 2013.

(51) Int. Cl.
*F16K 17/00* (2006.01)
*F16K 17/36* (2006.01)
*F16K 17/10* (2006.01)
*F16K 17/30* (2006.01)
*G05D 7/01* (2006.01)

(52) U.S. Cl.
CPC .............. *F16K 17/36* (2013.01); *F16K 17/10* (2013.01); *F16K 17/30* (2013.01); *G05D 7/0133* (2013.01); *Y10T 137/1842* (2015.04)

(58) Field of Classification Search
CPC ....... G05D 7/0133; F16K 17/10; F16K 17/30; F16K 17/36; Y10T 137/1842
USPC ...... 251/15, 22; 73/861.61, 861.62; 137/463
See application file for complete search history.

(56) References Cited

U.S. PATENT DOCUMENTS

| | | | |
|---|---|---|---|
| 2,926,690 A * | 3/1960 | Martin | F16K 17/20 137/460 |
| 3,877,489 A | 4/1975 | Louie et al. | |
| 4,195,658 A * | 4/1980 | Dierksmeier | F16K 17/30 137/462 |
| 4,436,111 A * | 3/1984 | Gold | F16K 17/30 137/498 |
| 4,465,093 A | 8/1984 | Gold et al. | |
| 4,589,435 A | 5/1986 | Aldrich | |
| 4,590,962 A * | 5/1986 | Tespa | F16K 17/30 137/460 |
| 6,129,112 A | 10/2000 | Huthmann et al. | |
| 6,408,870 B1 | 6/2002 | Dulin | |
| 6,443,180 B1 * | 9/2002 | Samuelson | F16K 17/30 137/460 |
| 6,634,375 B2 * | 10/2003 | Olivas | F16K 17/30 137/458 |

(Continued)

*Primary Examiner* — Umashankar Venkatesan
(74) *Attorney, Agent, or Firm* — Lisa Foundation Patent Law Cilinic at Arizona State University

(57) ABSTRACT

An automatic shut-off device, comprising a housing member with a hollow opening, an inlet port coupled to a first end of the housing member, an outlet port coupled to a second end of the housing member, a valve coupled to the outlet port, a variable volume chamber within the housing member with an open end facing the inlet port of the housing member and a closed end with flow restriction holes in closed end facing the outlet port of the housing member, a one-way valve disposed in the closed end of the variable volume chamber, and a spring-biased piston within the variable volume chamber with a compressible spring coupled to the piston at the closed end of the chamber wherein the piston is mechanically coupled to the valve.

16 Claims, 14 Drawing Sheets

(56) References Cited

U.S. PATENT DOCUMENTS

| | | | |
|---|---|---|---|
| 6,644,345 B2 | 11/2003 | Dulin | |
| 6,681,792 B2 | 1/2004 | Edward et al. | |
| 6,837,271 B1 | 1/2005 | Saint | |
| 7,111,638 B2 * | 9/2006 | Johnson | F16K 17/34 137/460 |
| 7,156,120 B2 | 1/2007 | Cherfane et al. | |
| 7,216,668 B1 | 5/2007 | Adams | |
| 7,503,341 B1 * | 3/2009 | Achterman | F16K 17/30 137/498 |
| 7,644,726 B1 | 1/2010 | Achterman | |
| 7,681,598 B2 | 3/2010 | Knapp | |
| 7,798,165 B2 | 9/2010 | McClung, Jr. | |
| 8,020,582 B2 * | 9/2011 | Lea-Wilson | F16K 17/30 137/460 |
| 8,047,224 B2 | 11/2011 | Eichler | |
| 8,485,220 B2 * | 7/2013 | Riano Gutierrez | G05D 7/0133 137/513.3 |
| 2010/0193048 A1 * | 8/2010 | Chang | F16K 7/07 137/460 |

* cited by examiner

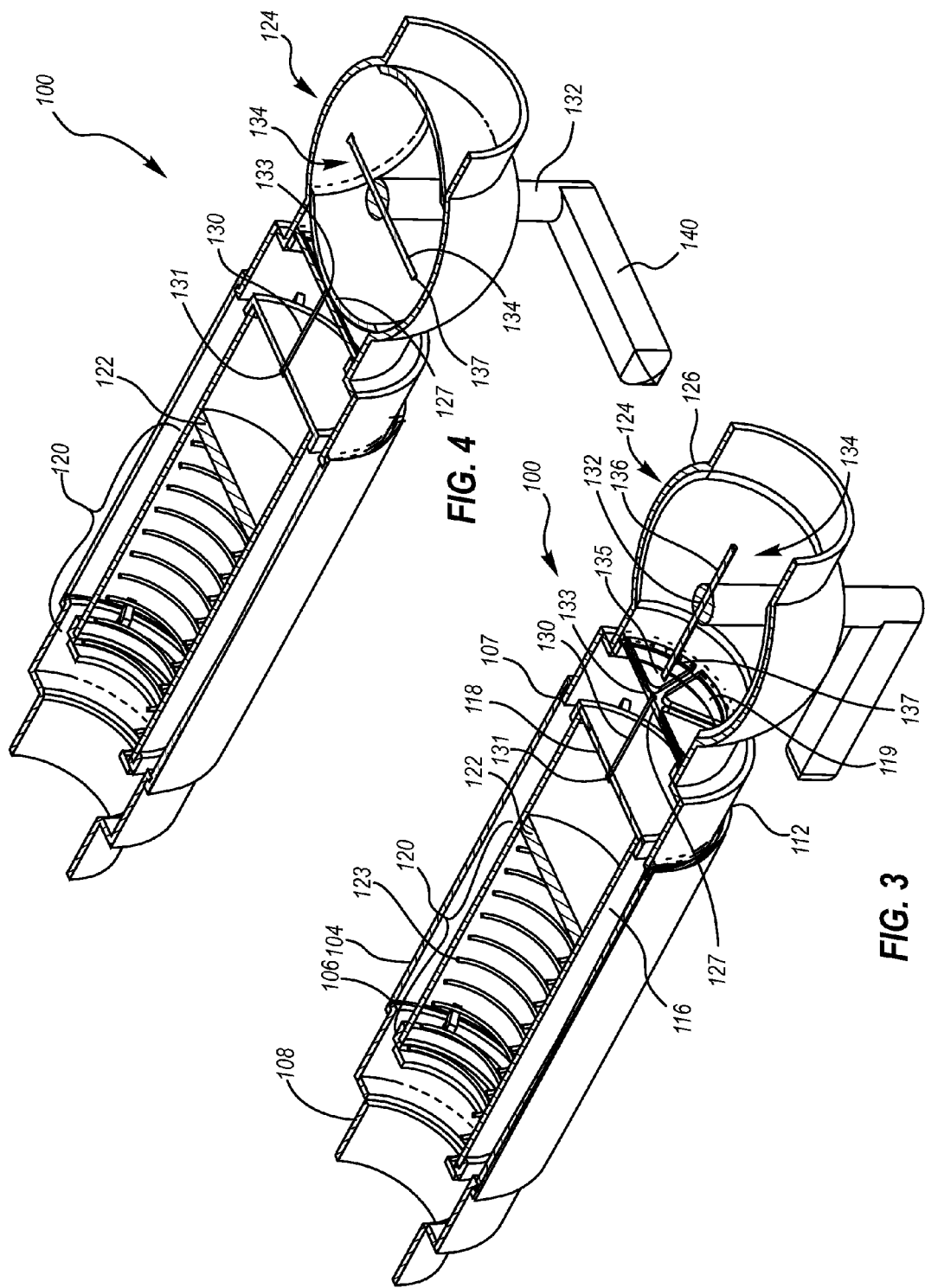

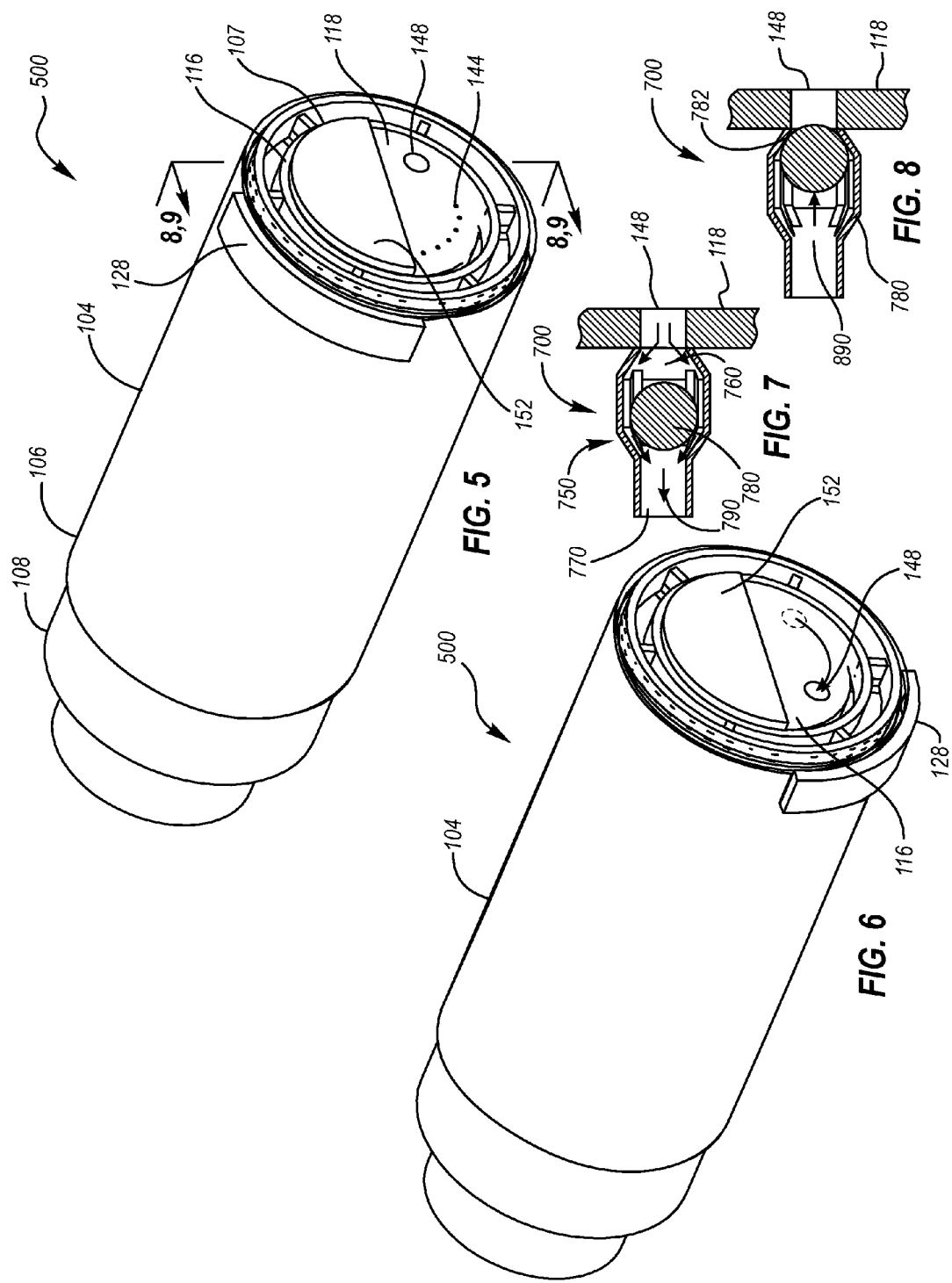

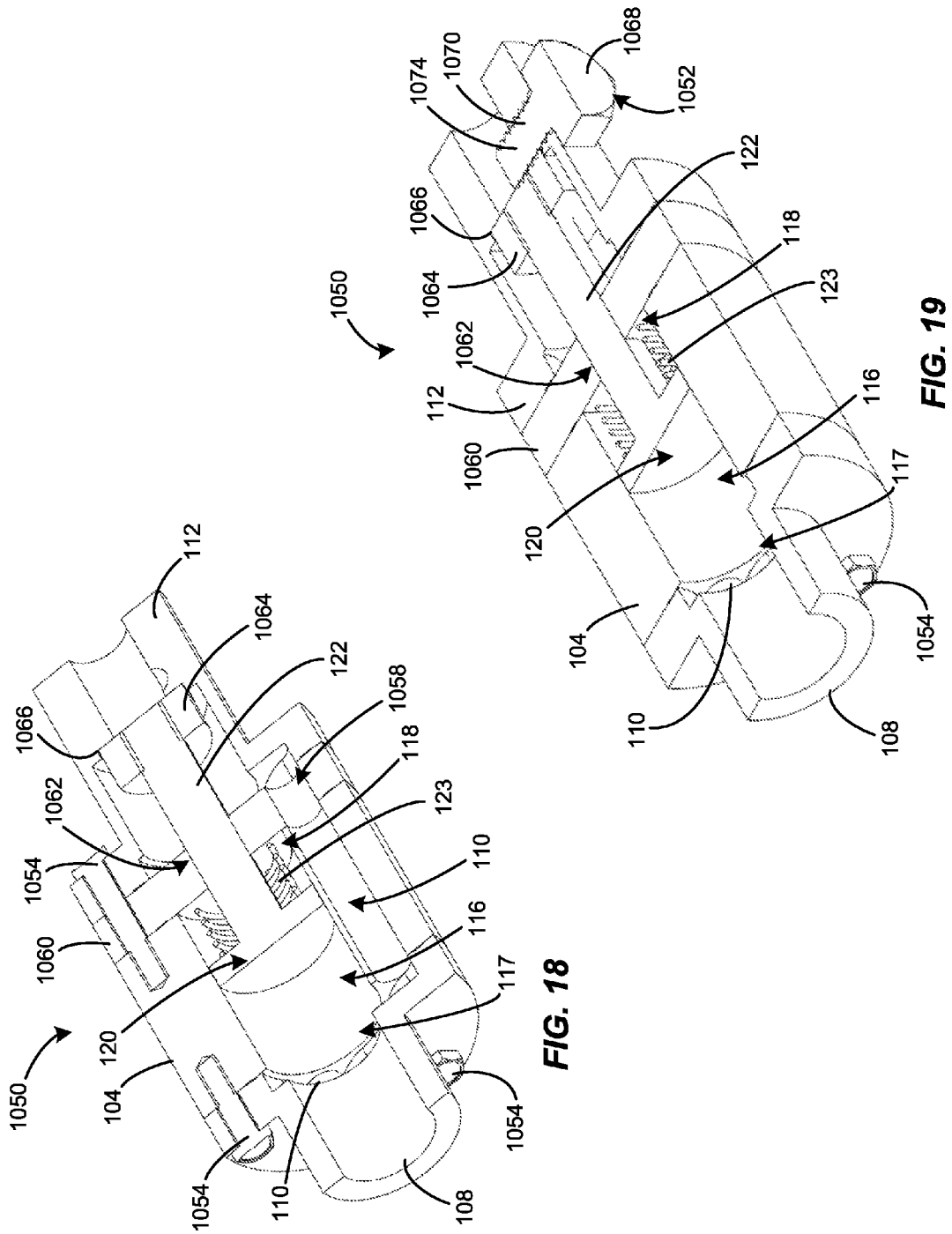

AUTOMATIC SHUT-OFF DEVICE

CROSS-REFERENCE TO RELATED APPLICATIONS

This application is a continuation-in-part of and claims priority to patent application Ser. No. 14/098,998 filed on Dec. 6, 2013, entitled "Automatic Shut-off Device," which claims priority to U.S. Provisional Application No. 61/806,624 filed on Mar. 29, 2013, entitled "Automatic Shutoff Device," the disclosures of which are herein incorporated by reference.

BACKGROUND OF THE INVENTION

Field of the Invention

This invention generally relates to automatic fluid shut-off devices. Such devices find use in applications where it is desired to provide for the automatic shut-off of a pressurized water line that has a leak to prevent damage to structures or to prevent waste of water. In particular, automatic fluid shut-off valves that shut off with slow constant flow through the pipe and do not require electricity are desired in applications such as homes where the occupants may be absent or otherwise unaware of a slow leak in the water supply line.

Description of Related Art

Various types of automatic shut-off devices and valves are available to detect leaks and shut off water supply lines before serious damage occurs. Current automatic shut-off devices and valves that shut off during periods of slow, constant flow require a separate electrical power source. Alternatively they have features that are not compatible with shutting off home water supplies after long periods of slow, steady flow.

U.S. Pat. No. 4,589,435 of Aldrich et al. describes a water shut-off valve comprising a cylindrical body having a valve disk and water flow sensor. The sensor is connected to an electronic timer that resets to zero when water flow is interrupted. The valve automatically closes when there is a continuous flow of water for a predetermined amount of time. The timer may be set for selected time periods allowing the valve to stay open for short of long periods of time as required.

U.S. Patent Publication No. 2010/0193048 of Chang describes an overflow shut-off valve that is designed to automatically cut off water flow when water flow exceeds a certain amount. Its design allows for self-cleaning and it has an automatic resetting function. The valve consists of an outer body that has an inlet and outlet port with an internally installed rubber Venturi tube assembly, fixed flange, moving flange, coil spring and surge flow suppressing orifice. The valve automatically shuts off when lower pressure causes a rubber tube to be compressed by the water pressure. The overflow shut-off valve turns off when the supply water pressure drops below 5 psi.

U.S. Pat. No. 7,111,638 of Johnson describes a flexible connector that prevents excess flow of fluid when there is a rupture or separation of the connector. A spring biases the valve in an open position. The valve closes when the pressure exceeds a pre-determined amount after a time delay effected by a damping system that uses a variable volume damper chamber that includes a flexible bladder.

U.S. Pat. No. 7,503,341 of Achterman describes a flow shut-off valve that has a flow metering sleeve within a flow passage. The sleeve and passage form an annular space. The sleeve includes a flow metering aperture that is downstream from the annular space. A valve member is mounted within the sleeve. The valve may move between no flow, normal flow, and a shut-off position.

U.S. Pat. No. 8,485,220 of Gutierrez describes an automatic flow regulator valve designed to regulate water pressure from a liquid source outlet in the event of pressure surges or fluctuations. The regulator has a spring and sealing plate. The sealing plate moves based upon water pressure, moving the valve from an open state to a closed state.

Applicants believe that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention provides an automatic fluid shut-off device that shuts fluid flow off of a pressurized line carrying fluid such as a water supply line for a home or other building. The automatic fluid shut-off device shuts off a water line after a constant flow of water runs for a predetermined time period and flow rate.

In various representative aspects, the present invention may provide an automatic fluid shut-off device comprising a housing member having a first end and a second end with a hollow opening inside the housing member between the first end and second end. An inlet port may couple to the first end of the housing member. An outlet port may couple to the second end of the housing member. There may be a sealing ring applied to the inlet and outlet ports and in contact with the housing member. A variable volume chamber may be disposed within the housing member with an open end of the variable volume chamber facing the inlet port of the housing member and a closed end with flow restriction holes in the closed end of the variable volume chamber facing the outlet port of the housing member. The flow restriction holes may be configured in such a way that the fluid flowing through the housing member impinges on the piston, flows around the chamber and into the outlet port and into the restriction holes in such a way that the piston will actuate valve to the off position when constant flow is achieved for a prolonged period of time and resets the valve to the open position when the flow of water changes. A spring-biased piston may be disposed within the variable volume chamber with a compressible spring coupled to the piston at the closed end of the chamber wherein the piston is mechanically coupled to the valve. A one-way valve may be disposed in the closed end of the variable volume chamber. There may be a disk comprised of an outer rim and a center support member comprising an aperture rigidly connected to the rim of the disk at least one point wherein the disk may be disposed between the housing member and the valve within the outlet port with a first side of the aperture facing the housing member and a second side facing the valve. The disk may further comprise a plurality of rigid connections between the rim and center support member and aperture. There may also be a button rod with a first end and second end disposed between the variable volume chamber with the first end of the button rod mechanically coupled to the spring-biased piston through an aperture in the variable volume chamber and the second end of the button rod mechanically coupled to the center support member aperture, the button rod coupled to the center support member aperture on the first side of the aperture. The button rod may further comprise a spring. The button rod may further be disposed within an aperture in a valve. There may be an indicator handle coupled to the housing member such that the flow restriction holes are blocked when the indicator handle rotates. There may be a rod which can block the flow restriction holes. There may be a filter disposed within the variable volume chamber. A valve may couple to the outlet port of the housing member. The valve may comprise a spring-loaded ball valve comprising a valve body, a stem, a torsion spring, and a ball disk. There may also be a spring rod with a first end mechanically coupled to the disk through the center support member and aperture at the second side and in contact with the button rod and a second end mechanically coupled to the stem of the valve when the valve is in the on position. There may be a spring-loaded tip at the first end of the spring rod that protrudes partially through the thickness of the aperture in contact with the button rod. There may be a first end of the spring rod mechanically coupled to the stem of the ball valve, holding the valve spring in tension when the valve is in the on position. The first end of the spring rod may be un-coupled from the center support member aperture, with the valve spring relaxed when the valve is in the off position. The valve may comprise a shut-off block valve comprising a handle, a first and second opening, an inlet port, an outlet port, at least one fluid passageway, and a piston which penetrates the channels in the off position and allows flow in the on position. The valve may comprise passageways that can be fully or partially blocked by the button rod. The valve may comprise a handle which may be mechanically coupled to the housing member of a valve. The handle may freely slide within the housing member of a valve and may prevent fluid flow while inserted. The valve housing member may comprise at least one passageway which fluid can flow through. The valve may further comprise a pressure relief chamber.

By now it should be appreciated that there has been disclosed an automatic shut-off valve comprising a housing member with a hollow opening with an inlet port and an outlet port, a spring loaded ball valve comprising a valve body, stem, ball disk, and spring coupled to the outlet port, a shut-off block valve comprising a valve body, an inlet port, an outlet port, at least one passageway for fluid flow deposed between the inlet and outlet ports, and a piston which penetrates the passageways in the off position, a variable volume chamber within the housing member with an open end facing the inlet port of the housing member and a closed end with flow restriction holes in closed end facing the outlet port of the housing member, a one-way valve disposed in the closed end of the variable volume chamber, a disk comprised of an outer rim and a center support member comprising an aperture rigidly connected to the rim of the disk at least one point wherein the disk is disposed between the housing member and the valve with a first side of the aperture facing the housing member and a second side facing the valve and a spring-biased piston within the variable volume chamber with a compressible spring coupled to the piston at the closed end of the chamber wherein the piston is mechanically coupled to the spring-loaded ball valve.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that they can be their own lexicographers if desired.

The inventor expressly elects, as his own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 3 depicts a cut-away view of the automatic shut-off device in an off position.

FIG. 4 depicts a cut-away view of the automatic shut-off device in an on position.

FIG. 5 depicts a perspective view of the housing member when device is set in an active position.

FIG. 6 depicts a perspective view of the housing member when device is set in an inactive position.

FIG. 7 depicts a cut-way side view of the one-way valve for conditions allowing filling and resetting of variable volume chamber.

FIG. 8 depicts a cut-way side view of the one-way valve for conditions preventing triggering of variable volume chamber.

FIG. 18 depicts a cross-sectional view of the automatic shut-off device of FIG. 15 in an off position.

FIG. 19 depicts another cross-sectional view of the automatic shut-off device of FIG. 15 in an off position.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
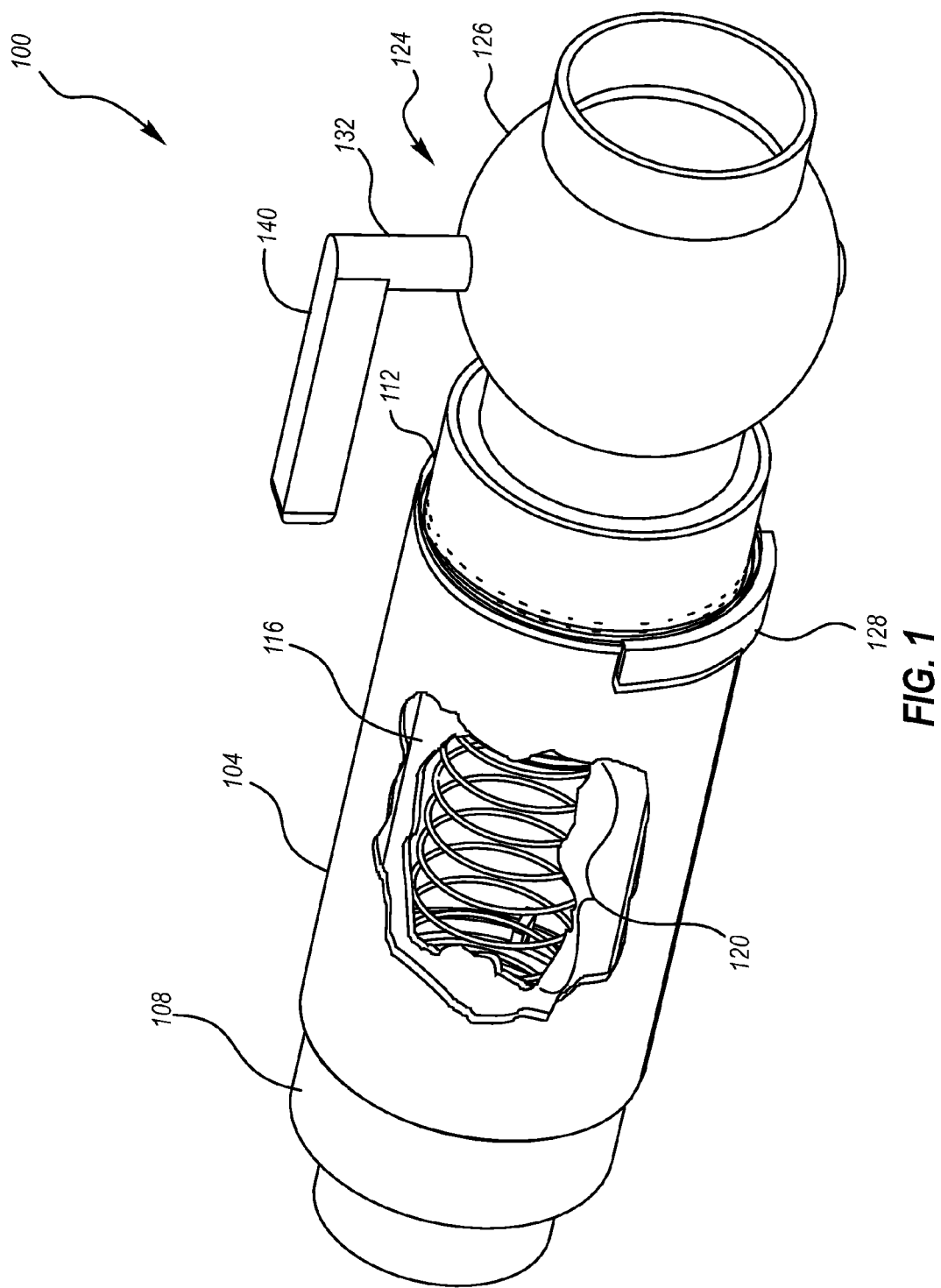
FIG. 1 depicts a perspective view of the automatic shut-off device according to one embodiment of the present invention.

In one application of the invention, referring now to FIG. 1, a device according to various aspects of the invention is depicted from a perspective view with a cut-out showing its internal features. In the embodiment pictured in FIG. 1, the automatic shut-off device 100 comprises a housing member 104 with a hollow opening, an inlet port 108, an outlet port 112, a variable volume chamber 116, and a valve 124. The inlet port 108 couples to the housing member 104 on a first end of the housing member. The outlet port 112 couples to the housing member 104. The coupling of the inlet port 108 and outlet port 112 to the housing member 104 may be a fixed or rotary coupling wherein the housing member may turn freely around the inlet and outlet ports. A sealing ring (not shown) may be coupled to the inlet port 108. A sealing ring (not shown) may be coupled to the outlet port 112. The variable volume chamber 116 is contained within the hollow opening of the housing member and contains a spring-biased piston 120. The spring-biased piston 120 may comprise a sealing ring (not shown). An indicator handle 128 is attached to the housing member near the outlet port to show its position. The housing member 104 may comprise material selected from the group comprising plastic, PVC, brass, aluminum, steel, cast iron, titanium, or alloys of these metals although other materials may be used. The inlet and outlet ports 108 and 112 may comprise one or more of the following materials: plastic, PVC, brass, aluminum, steel, cast iron, titanium, and alloys of these metals, although other materials may be used. The variable volume chamber 116 may comprise one or more of the following materials: plastic, PVC, brass, aluminum, steel, cast iron, titanium, and alloys of these metals, although other materials may be used. A valve 124 is connected to the outlet port 112 with a fixed connection comprising solder, plastic cement or other connection appropriate for the materials used for the outlet port and valve. In some embodiments, the valve comprises a spring-loaded ball valve comprising a valve body 126, stem 132, and handle 140. In other embodiments, other types of valves may suffice so long as the valve resets itself to the off position when no force is applied to the valve.

During operation, the spring biased piston 120 mechanically actuates the spring-loaded ball valve 124 tripping it from an on to an off position when water flows constantly for a sustained period of time and at a constant flow. After the water flow is shut off, the user must then reset the device by locking the handle 140 back into the on position as is shown in FIG. 1. To adjust the amount of water flow and time required to trip the ball valve, the user turns the housing member about the inlet and outlet ports 108 and 112 as well as variable volume chamber 116 to adjust the rate at which the spring biased piston 120 will mechanically actuate the spring-loaded ball valve 124.

Figure 2:
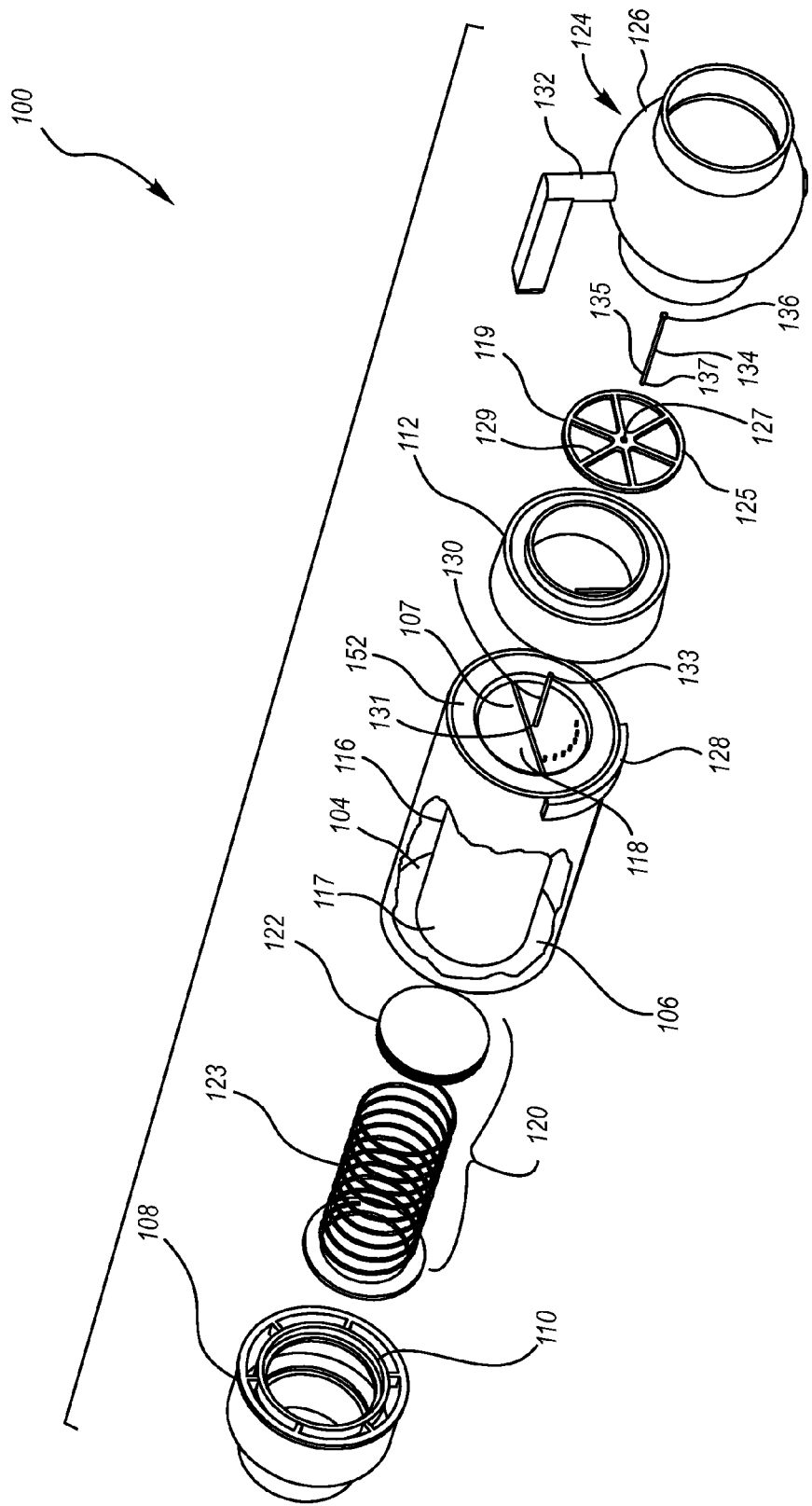
FIG. 2 depicts a perspective view of the disassembled components of the automatic shut-off device according to one embodiment of the present invention.

Referring now to FIG. 2, an automatic shut-off device 100 according to various aspects of the invention is depicted from a perspective exploded view to show, in greater detail, the assembly of the various components. As shown in FIG. 2, the housing member 104, has a first end 106 and a second end 107 that couple to the inlet port 108 and outlet port 112 respectively. The second end has a blanking plate 152 that covers approximately half of the second end 107 of the housing. The inlet and outlet ports 108 and 112 may have a rotary coupling with the housing member 104. The inlet port 108 and outlet port 112 may fit within housing member 104. A plurality of passages 110 are incorporated into the inlet port 108 to allow fluids to flow between the variable volume chamber 116 and the inside of housing member 104. The variable volume chamber 116 having an open end 117 and a closed end 118 is disposed within the housing member 104. The spring-biased piston 120 comprising a spring 123 and piston 122 is placed at the open end 117 of the variable volume chamber 116. An indicator handle 128 is attached to the housing member near the outlet port to show its position. The piston 122 may comprise plastic, PVC, brass, aluminum, steel, stainless steel, cast iron, titanium, or alloys of these metals, although other materials may be used. The piston 122 may use a sealing ring (not shown) to seal the piston 122 to the inner wall of the variable volume chamber 116. The sealing ring may comprise rubber, plastic, neoprene, Teflon, or other suitable sealing material. The spring 123 may comprise steel, stainless steel, or alloys of these metals although other materials may be used. A disk 119 is placed facing the outlet port 112. The disk 119 comprises a rim 125, a center support member and aperture 127 that is supported by one or more supports 129. The disk 119 may comprise one or more of the following materials: plastic, PVC, brass, aluminum, steel, cast iron, titanium, and alloys of these metals, although other materials may be used. A button rod 130 with a first end 131 and a second end 133 is coaxially placed in the closed end of the variable volume chamber 118 in such a way that it slides freely and contacts the spring biased piston 120. The button rod 130 may comprise one or more of the following materials: plastic, PVC, brass, aluminum, steel, stainless steel, cast iron, titanium, and alloys of these metals, although other materials may be used. A spring rod 134 with a first end 135 and a second end 136 is placed between the center support member and center support member and aperture 127. The spring rod 134 may comprise plastic, PVC, brass, aluminum, steel, stainless steel, cast iron, titanium, or alloys of these metals, although other materials may be used. The first end of the spring rod has a spring loaded tip 137 that allows the end to be retracted when pushed externally. The spring rod 134 couples to the spring-loaded ball valve 124 at the valve stem 132 inside the valve body 126 (connection not shown).

Referring now to FIG. 3, an automatic shut-off device 100 in the "on" position according to various aspects of the invention is depicted from a perspective cross-section view to show, in greater detail, the operation of the automatic shut-off device as well as the interworking and relationships between the various components. As shown in FIG. 3, the housing member 104, has first end 106 and a second end 107 that couple to the inlet port 108 and outlet port 112 respectively. The inlet and outlet ports 108 and 112 have a rotary coupling with the housing member 104. The spring-biased piston 120 comprising a spring 123, and piston 122 is disposed within the variable volume chamber 116. A disk 119 is placed inside of the outlet port 112 using a press fit, welding, soldering, or cement although other attachment methods may be used. A button rod 130 with a first end 131 and a second end 133 is coaxially placed through the closed end of the variable volume chamber 118 in such a way that it slides freely and contacts the piston 122. A spring rod 134 with a first end 135 and a second end 136 is placed with the first end 135 coupled to the center support member and aperture 127 within the disk 119. The first end of the spring rod has a spring loaded tip 137 that allows the end to be retracted when pushed externally. The spring rod 134 couples to the spring-loaded ball valve 124 at the valve stem 132 inside ball disk 135 within the valve body 126. During operation in the "on" position, as is depicted here, the piston 122 does not contact the button rod 130 with sufficient force to compress the spring loaded tip 137 which, in turn, allows the spring loaded tip 137 of the spring rod 132 connected to the stem 132 of valve 124 to remain seated in the center support member and aperture 127, keeping the spring loaded ball valve in the open position.

Referring now to FIG. 4, an automatic shut-off device 100 in the "off" position according to various aspects of the invention is depicted from a perspective cross-section view to show, in greater detail, the operation of the automatic shut-off device as well as the interworking and relationships between the various components. During transition to and operation in the "off" position, as is depicted here, the piston 122 contacts the first end 131 of button rod 130 and the second end of the button rod 133 forces spring loaded tip 137 of the spring rod 134 to retract and then unseat from center support member and aperture 127 as the stored tension in stem 132 of the spring-loaded valve 124 is released and the spring-loaded valve assumes the "off" position thereby cutting off the flow of water.

Referring now to FIG. 5, a portion of the automatic shut-off device 500 according to various aspects of the invention is depicted from a perspective view to show, in greater detail, the operation of the interworking and relationships between the various components. The housing member 104 is depicted showing the second end 107 and the closed end of the variable volume chamber 118 wherein a blanking plate 152 covers half of the closed end 118 of the variable volume chamber 116. The closed end 118 of the variable volume chamber further comprises one or more flow restriction holes 144 and one or more inlet holes 148 to accommodate one or more one-way valves inside of the variable volume chamber 116. The flow restriction holes 144 are used in conjunction with the one-way valve to set the flow rate and time that it will take for the variable volume chamber to actuate the mechanical linkage to the spring loaded ball valve (not shown). The number of flow restriction holes 144 is preferably between 4 and 8 although other numbers of holes may be used. The diameter of the flow restriction holes may be between 0.0135 inches and 0.104 inches and may be drilled using an 80 gauge drill bit or a 38 gauge drill bit, respectively. While these hole sizes are preferred, other hole sizes may be used without departing from the scope of the invention. As depicted in FIG. 5, the housing member 104 is turned with respect to the variable volume chamber 116 using the indicator handle 128. In so doing, the blanking plate 152 covers the restriction holes 144 to varying degrees. When no holes are covered during times of slow water flow, the variable volume chamber will fill very slowly, if at all, since the water is allowed to escape from the variable volume chamber 116 and comparatively little water will enter the chamber 116. During operation and depending how may of the flow restriction holes 144 are covered by blanking plate 152, the holes will allow between 0.5 and 2.5 gallons per minute to flow while, without departing from the scope of the invention, other flow rates may be used.

Referring now to FIG. 6, various aspect of the invention are depicted and described further. Accordingly, the housing member 104 is turned with respect to the variable volume chamber 116 using the indicator handle 160. In so doing, the blanking plate 152 covers the holes. When all holes are covered during times of slow water flow, the piston 122 (not shown) within the variable volume chamber will not apply the force necessary to trip the button rod 130 (not shown), since the water cannot escape from the variable volume chamber 116.

Referring now to FIG. 7 additional aspects of the automatic shut-off device are depicted from a cross sectional view. The closed end of the variable volume chamber 118 has an inlet hole 148 connected to a one way valve 700. The one-way valve 700 comprises an outer housing 750, an inlet passage 760, and outlet passage 770, and a check ball 780. The one-way valve 700 operates to allow fluid to flow through the valve in a direction 790 away from the inlet hole 148 of the closed end 118 of the variable volume chamber 106.

Referring now to FIG. 8 additional aspects of the automatic shut-off device are depicted from a cross sectional view. In this view the one-way valve 700 operates to not allow fluid to flow through the valve in a direction 890 toward the inlet hole 148 of the closed end 118 of the variable volume chamber 106. Here the fluid flow in the direction 890 toward the inlet hole 148 is stopped when check ball 780 seats against valve seat 782 thus preventing flow out of inlet hole 148.

Figure 9:
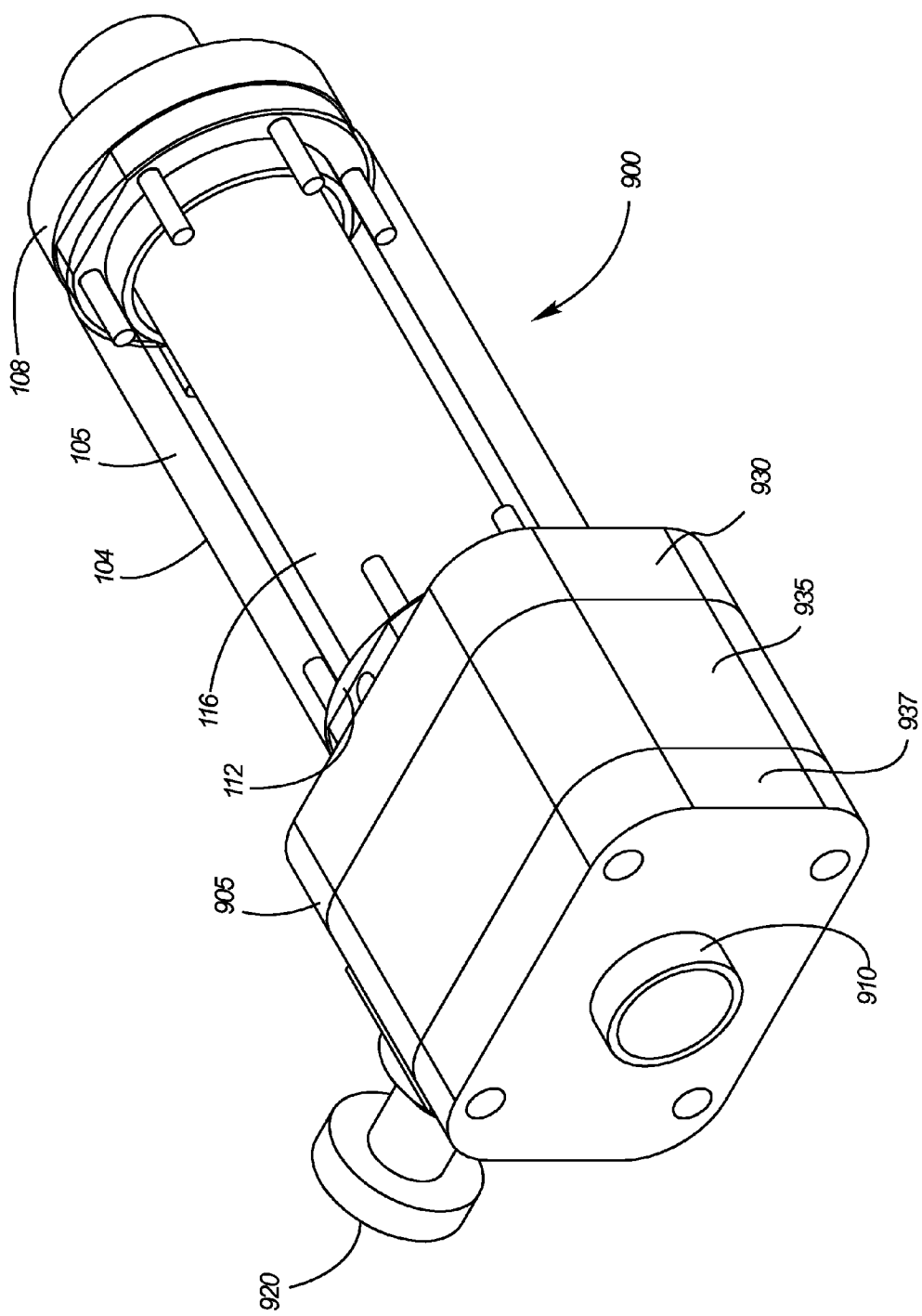
FIG. 9 depicts a perspective view of the automatic shut-off device according to one embodiment of the present invention

Referring now to FIG. 9, another embodiment of the automatic shut-off device 900 according to various aspects of the invention is depicted from a perspective view. In the embodiment pictured in FIG. 9, the automatic shut-off device 900 comprises a housing member 104 with a hollow opening 105, an inlet port 108, an outlet port 112, a variable volume chamber 116, and valve 905. The inlet port 108 couples to the housing member 104 on a first end of the housing member. The housing member 104 comprises an outlet port 112 which couples to shut-off block valve 905. The coupling of the inlet port 108 to the housing member 104 and the outlet port 112 to the shut-off block valve 905 may be a fixed or rotary coupling wherein the housing member 104 may turn freely around the inlet 108 and outlet 112 ports. The variable volume chamber 116 is contained within the hollow opening 105 of the housing member 104. The housing member 104 may comprise one or more of the following materials: plastic, PVC, brass, aluminum, steel, cast iron, titanium, and alloys of these metals; however other materials may also be used. The inlet port 108 and outlet port 112 may comprise one or more of the following materials: plastic, PVC, brass, aluminum, steel, cast iron, titanium, and alloys of these metals; however other materials may also be used. The variable volume chamber 116 may comprise one or more of the following materials: plastic, PVC, brass, aluminum, steel, cast iron, titanium, and alloys of these metals; however other materials may also be used.

In this embodiment, the shut-off block valve 905 comprises an outlet port 910, a handle 920, and sectionals 930, 935, and 937. The shut-off block valve 905 may comprise one or more of the following materials: plastic, PVC, brass, aluminum, steel, cast iron, titanium, and alloys of these metals, however other materials may be used. Sectional 930 of the shut-off block 905 is coupled to the outlet port 112 with a fixed coupling comprising solder, plastic cement, or another coupling appropriate for the materials used for the outlet port 112 and shut-off block valve 905.

During operation, the variable volume chamber 116 actuates shut-off block 905 tripping it from an on to an off position when water flows constantly for a sustained period of time and at a constant flow. The automatic shut-off device 900 shown in FIG. 9 is in an off position. After the water flow is shut off, the user must reset the device by pulling the handle 920 back into an on position.

Figure 10:
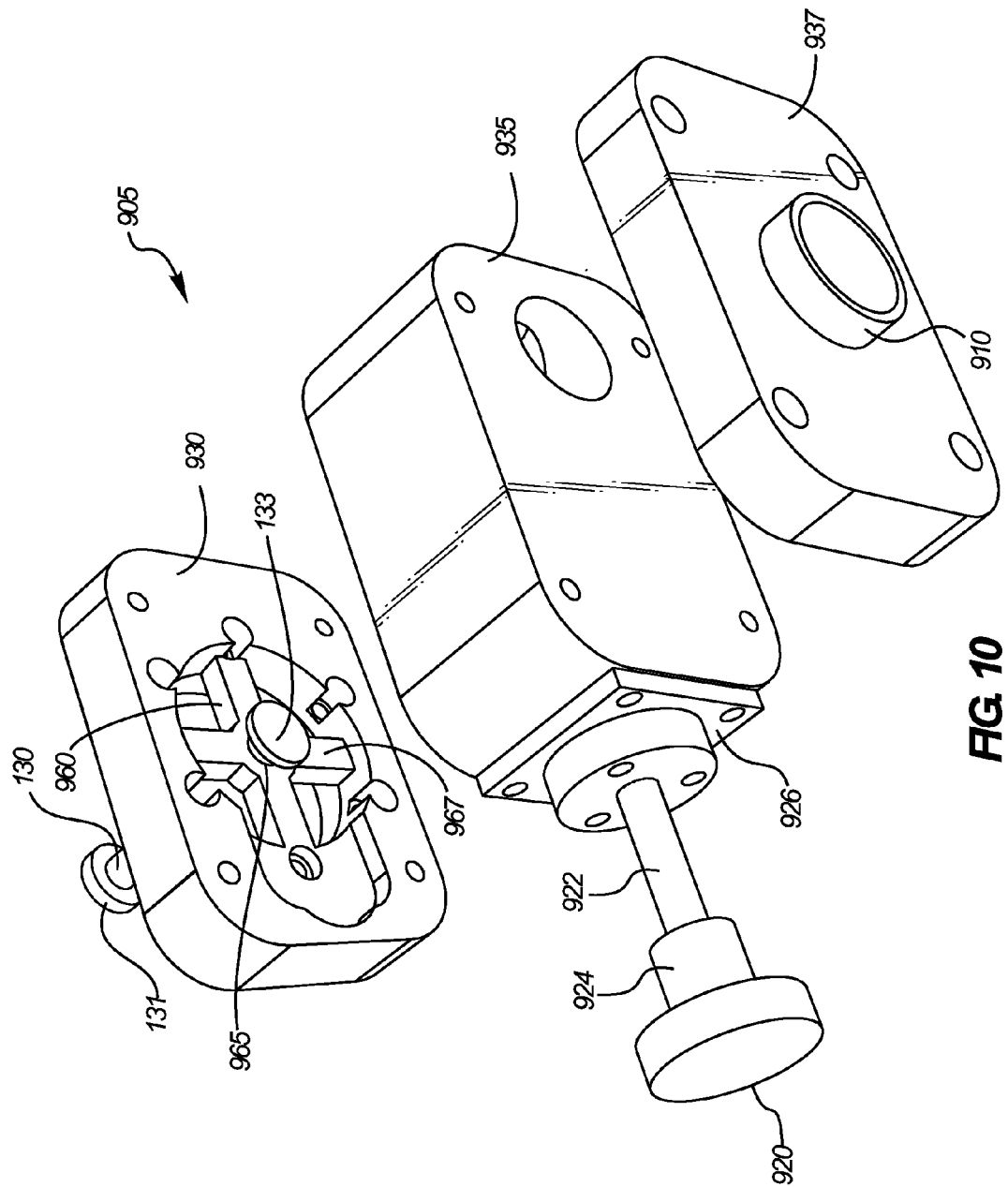
FIG. 10 depicts an exploded view of components of the valve of the automatic shut-off device according to one embodiment of the present invention.

Referring now to FIG. 10, a perspective and exploded view of the shut-off block valve 905 is depicted to show, in greater detail, the components of an implementation of a shut-off block valve 905. As shown in FIG. 10, the shut-off block valve 905 comprises an outlet port 910, a handle 920, and sectionals 930, 935, and 937. The handle 920 may comprise a rod 922, a cap 924 and a plate 926. The plate 926 may be coupled to sectional 935 to prevent leakage from the shut-off block valve 905. The plate 926 can be coupled to sectional 935 through solder, plastic cement, or another connection appropriate for the materials used for the plate 926 and the shut-off block valve 905. Sectional 930 may comprise a disk 960. Disk 960 may comprise an aperture 965 and center support structure 967. The button rod 130 of variable volume chamber 116 may be inserted into the aperture 965. The button rod 130 may slide freely through aperture 965. The button rod 130 in FIG. 10 is in a resting state. When a liquid flows constantly for a sustained period of time and at a constant flow in variable volume chamber 116, the button rod 130 will slide into sectional 935 and actuate the valve 905 tripping it from an on to an off position. Sectionals 930, 935, and 937 may comprise one or more of the following materials: plastic, PVC, brass, aluminum, steel, cast iron, titanium, and alloys of these metals, however other materials may also be used. Sectionals 930, 935, and 937 may be coupled together through solder, plastic cement, or another coupling appropriate for the materials comprising the sectionals 930, 935, and 937.

Figure 11:
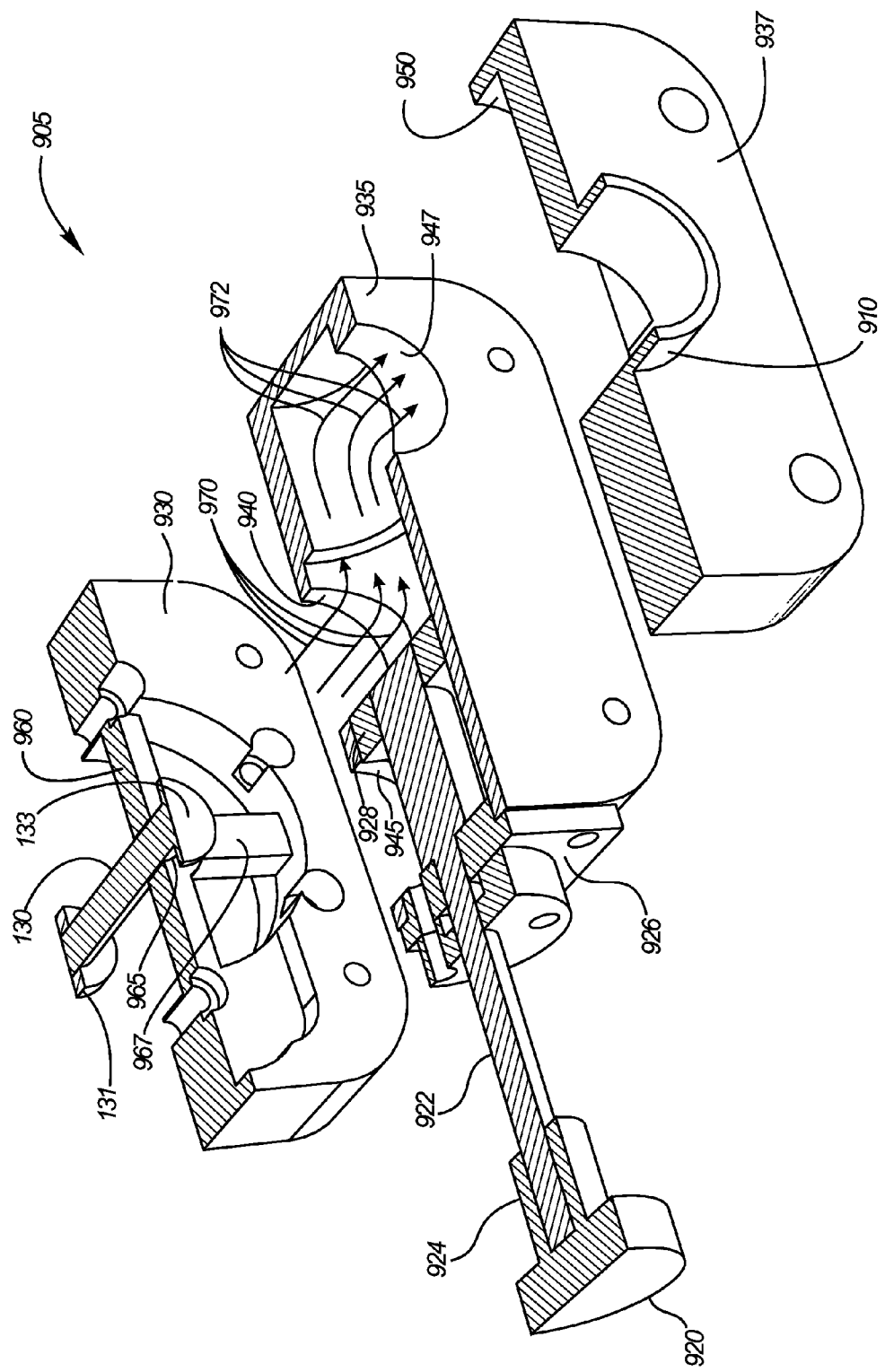
FIG. 11 depicts an exploded and cross-sectional view of the components of the valve in an active position for one embodiment of the present invention.

Referring now to FIG. 11, a cross sectional and exploded view of the shut-off block valve 905 is depicted as well as the button rod 130 from the previously depicted variable volume chamber 116. The shut-off block valve 905 comprises an outlet port 910, a handle 920, and sectionals 930, 935, and 937. Handle 920 comprises a rod 922, a cap 924, a plate 926, and a piston 928. Sectional 935 comprises passageways 940, 945, and 947. Sectional 937 comprises a passageway 950. Sectional 930 comprises a disk 960, an aperture 965, and a center support structure 967. The shut-off block valve 905 in FIG. 11 is in an on position, with the button rod 130 of the variable volume chamber 116 is not extended into the sectional 930, and the piston 928 of the handle 920 is plugging the space between passageway 945 and passageway 940. When the button rod 130 and piston 928 are in this position, water can freely flow from the automatic shut-off device around the center support frame 967 and into passageways 940 and 945. With passageway 945 plugged by piston 928, a fluid will only be routed through passageway 940 and then through passageway 947 as demonstrated by fluid flow lines 970 and 972. The fluid will then enter passageway 950 and continue to flow out of outlet 910.

Figure 12:
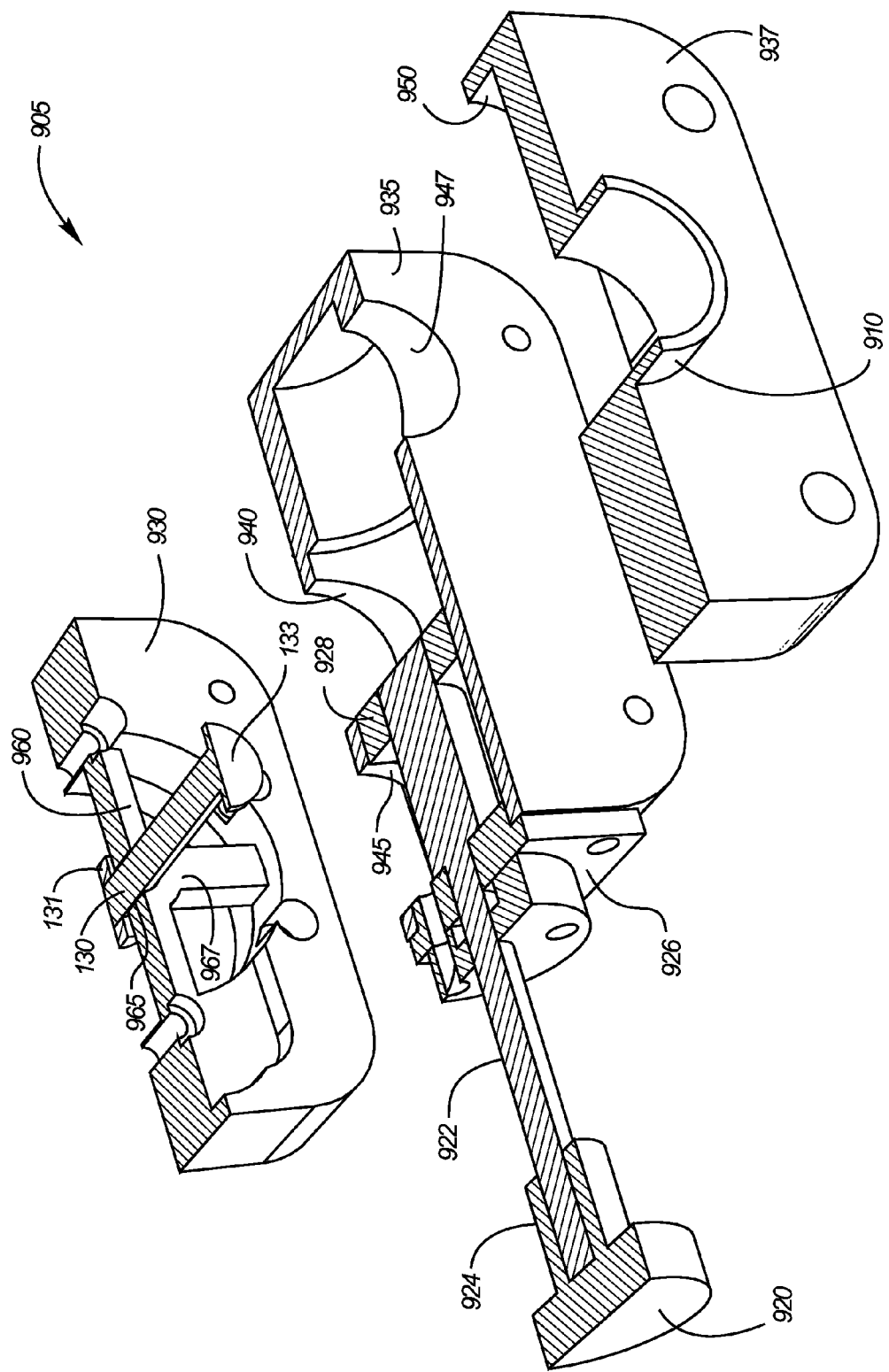
FIG. 12 depicts an exploded and cross-sectional view of the components of the valve in an intermediate position for one embodiment of the present invention.

Referring now to FIG. 12, a cross sectional and exploded view of the shut-off valve 905 is depicted as well as the button rod 130 with first end 131 and second end 133 from the previously depicted variable volume chamber 116. The water pressure in the automatic shut-off device 900 has caused the button rod 130 to extend past sectional 930. In this extended state, the second end 133 of the button rod 130 may partially or fully block passageway 940. When passageway 940 becomes blocked, the fluid will divert into passageway 945, as shown by fluid flow lines 974. When passageway 940 is only partially blocked, some fluid will continue to flow into the passageway 940 and travel along fluid lines 972, into passageway 950 and out of outlet 910.

Figure 13:
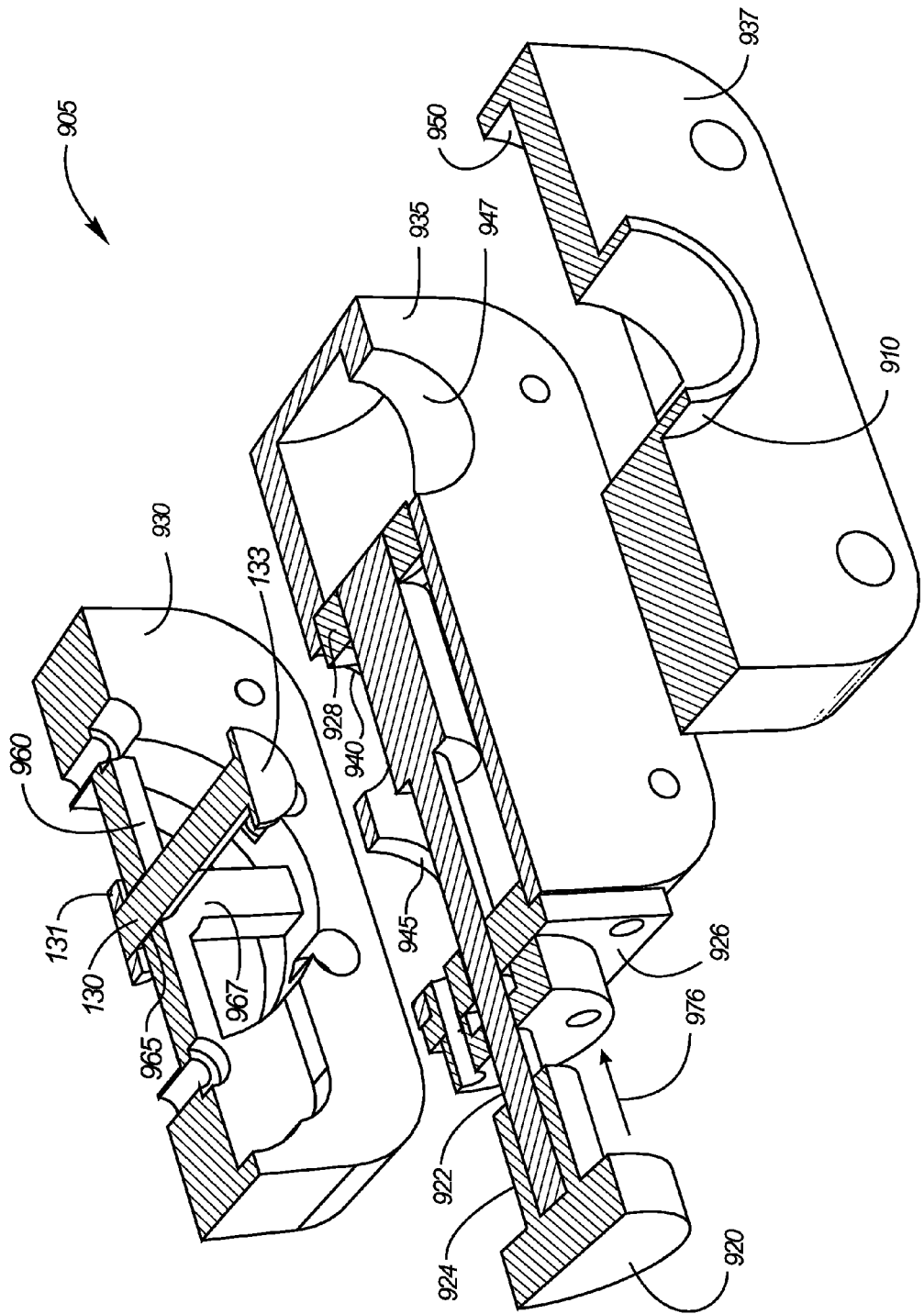
FIG. 13 depicts an exploded and cross-sectional view of the components of the valve in an inactive position for one embodiment of the present invention.

Referring now to FIG. 13, a cross sectional and exploded view of the shut-off block valve 905 is depicted as well as the button rod 130 with first end 131 and second end 133 from the previously depicted variable volume chamber 116. The valve in FIG. 13 is depicted in an off position. When the second end 133 of button rod 130 is extended to partially or fully block passageway 940, fluid is redirected into passageway 945. The redirection of fluid creates a pressure differential between the two passageways 940, 945, and causes the piston 928 of handle 920 to push into sectional 935, as shown by force line 976. When the pressure differential causes the piston 928 to completely enter sectional 935 it will seal the passageway 940 and cease all fluid flow through passageway 947 and no fluid can travel through passageway 950 and out of outlet 910 of sectional 937.

Figure 14:
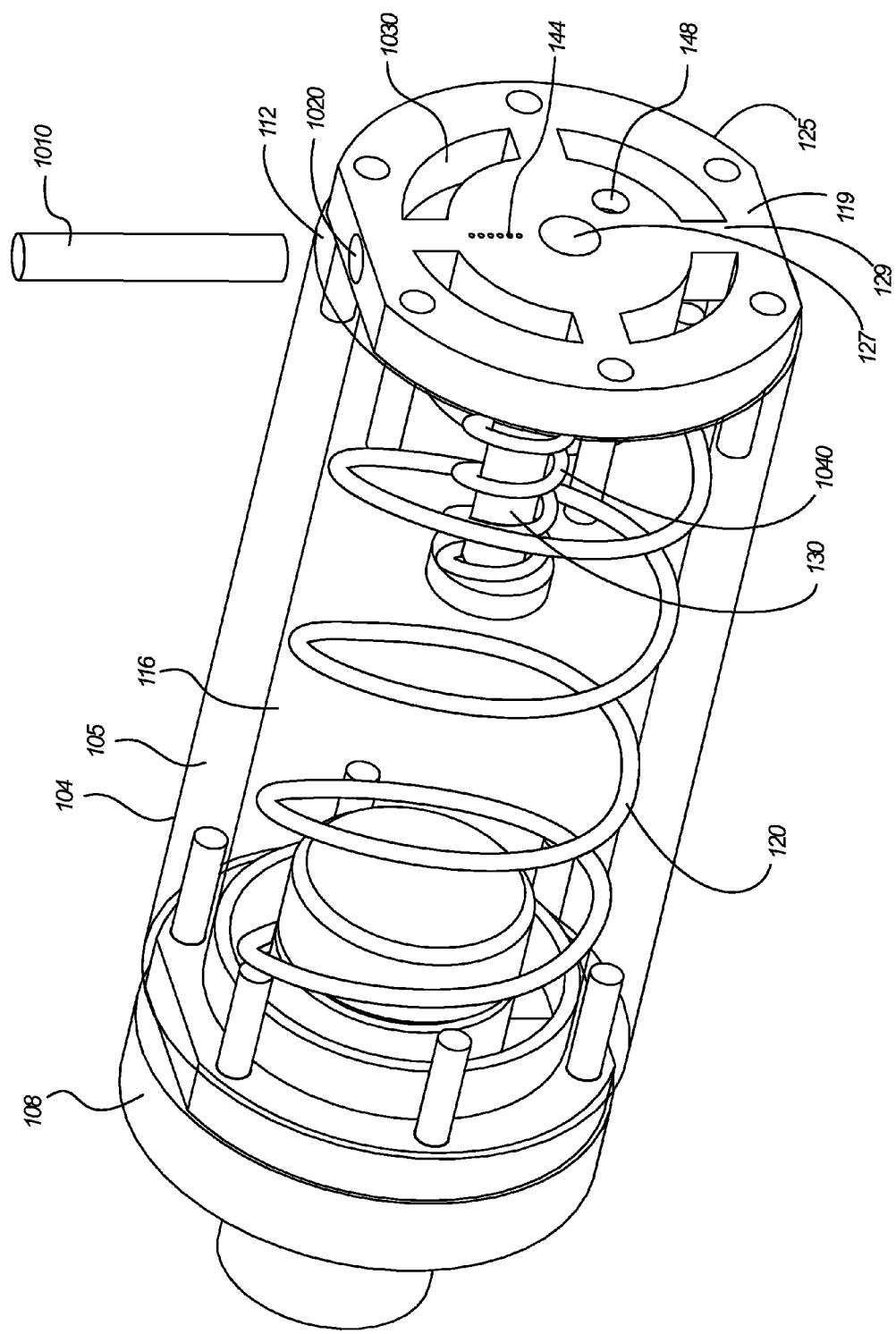
FIG. 14 depicts a perspective view of the automatic shut-off device according to one embodiment of the present invention.

Referring now to FIG. 14, another embodiment of the automatic shut-off device is depicted in a perspective view. FIG. 14 depicts a housing member 104 with a hollow opening 105 and a first and second open end, the housing member 104 further comprising an inlet cap 108 and outlet cap 112. The housing member 104 further comprises a variable volume chamber 116 which is disposed within the hollow opening of the housing member. A spring-biased piston 120 is depicted within the variable volume chamber, and is coupled to outlet 112. A button rod 130 is disposed within the variable volume chamber, and further comprises a spring 1040. A disk 119 is coupled to the outlet port 112, the disk comprising a rim 125, an aperture 127 and center support structure 129. The disk 119 may further comprise one or more passageways 1030. The disk may further comprise flow restriction holes 144. The flow restriction holes 144 may be arranged vertically or in any other way that permits them to control the flow of fluid out of them. Disk 119 may further comprise an aperture 1020 where a rod 1010 may be inserted. Rod 1010 may block any number of fluid restriction holes 144 within disk 119, and can be adjusted by changing how far the rod 1010 is inserted into aperture 1020. The disk 119 further comprises an inlet hole 148. A one way valve 700 may be inserted into inlet hole 148.

The automatic shut-off device in FIG. 14 is depicted in an on position. When a fluid enters inlet 108 it will push against the spring-biased piston 120 of the variable volume chamber 116 while also flowing around the chamber 116 in the hollow opening 105 between the housing member 104 and the variable volume chamber 116. The spring-biased piston 120 does not fully compress when the fluid is not constantly flowing for a sustained period of time and at a constant flow. When the fluid is constantly flowing for a sustained period of time and at a constant flow, the spring-biased piston 120 will compress and gradually push the button rod 130 through aperture 127. In some embodiments of this invention, the now extended button rod 130 will block fluid flow into another device such as a toilet. In other embodiments of the invention, the extended button rod 130 will actuate a valve 905 and trip it to an off position.

Figure 15:
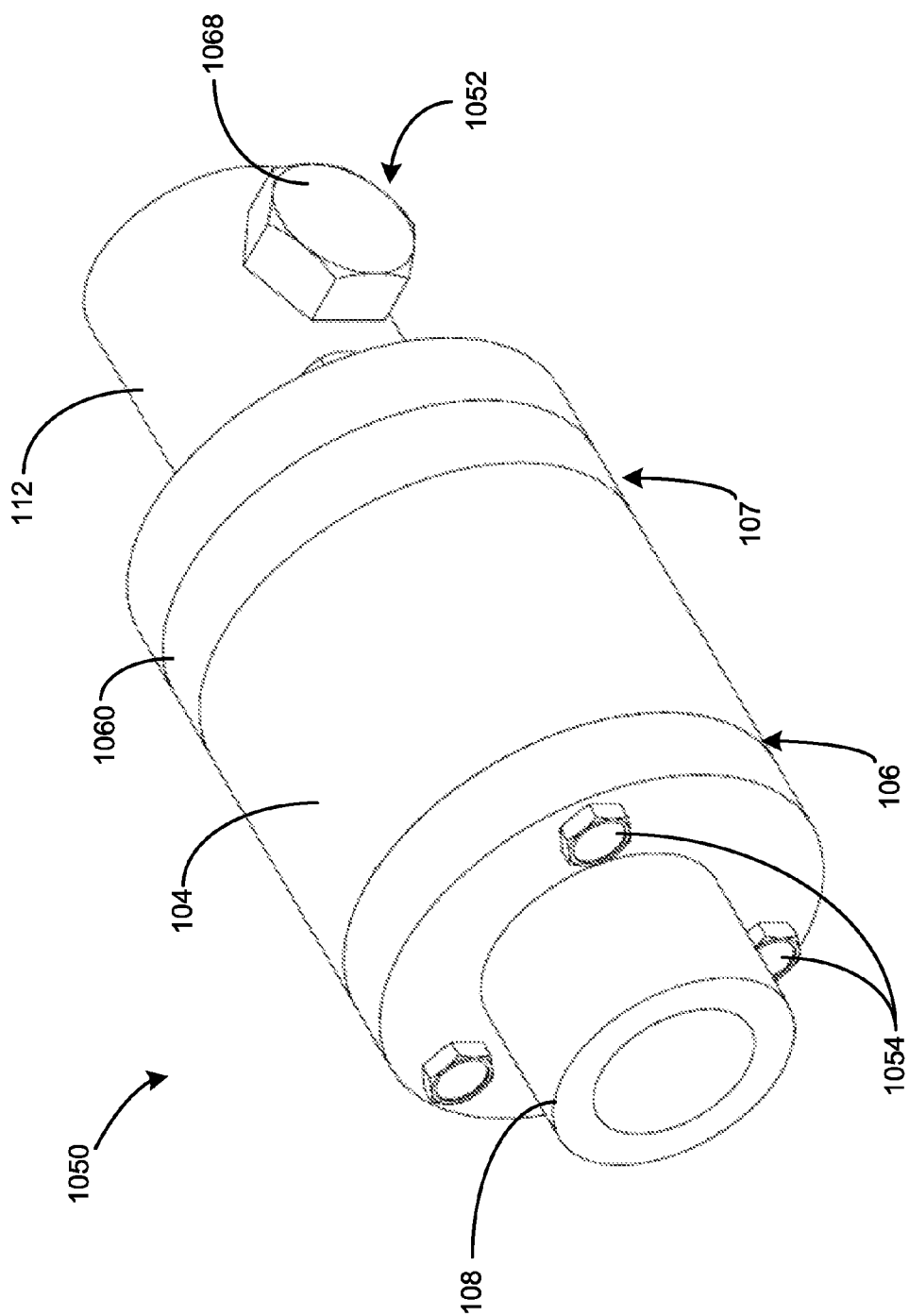
FIG. 15 depicts a perspective view of an automatic shut-off device according to one embodiment of the present invention.
Figure 16:
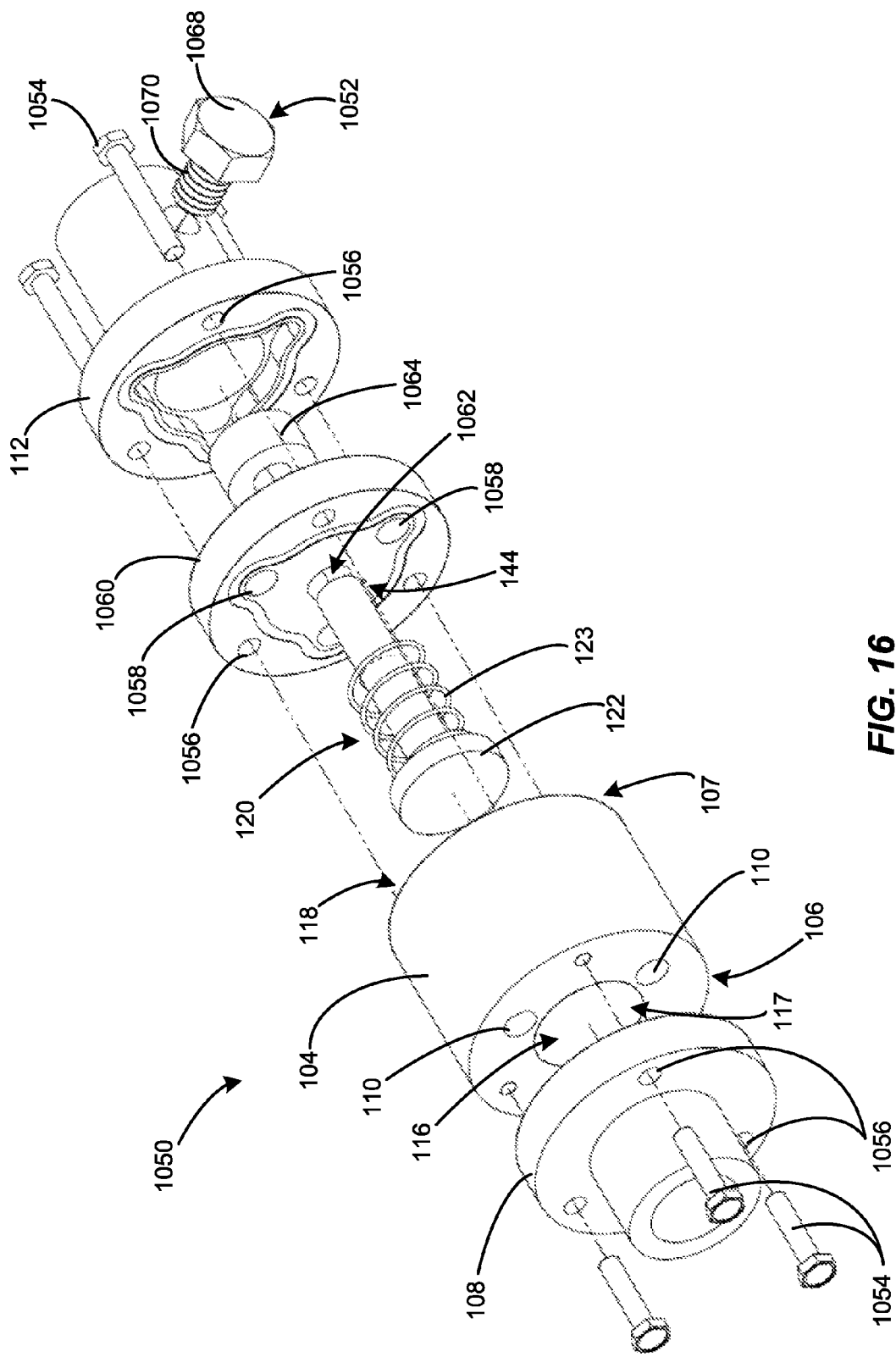
FIG. 16 depicts an exploded view of the automatic shut-off device of FIG. 15.

FIGS. 15-19 illustrate an automatic shut-off device 1050 according to another embodiment of the invention. As shown in FIG. 15, the device 1050 can include a housing member 104 with a first end 106 and a second end 107, an inlet port 108, an outlet port 112, and a pressure release screw 1052. The device components can be coupled together via fasteners 1054 fitted through fastener apertures 1056 (as shown in FIG. 16). Additionally, one or more sealing rings (not shown) can be positioned between the components to ensure a fluid-tight seal between the components when coupled together. As shown in FIG. 16, the device 1050 can further include a variable volume chamber 116 within the housing member 104, fluid passages 110 extending through the housing member 104, and a spring-biased piston 120 positioned substantially within the variable volume chamber 116. In some embodiments, a filter (not shown) can also be positioned within the variable volume chamber 116.

The variable volume chamber 116 can include an open end 117 near and downstream from the inlet port 108, and a closed end 118, formed by a chamber disk 1060, near and upstream from the outlet port 112. The chamber disk 1060 can be separate from and coupled to the housing member 104, as shown in FIGS. 15-19, or, in other embodiments, can be integral with the housing member 104. The chamber disk 1060 can include fluid passages 1058 that align with the fluid passages 110 of the housing member 104 to permit fluid flow from the inlet port 108, through the fluid passages 110, 1058, into the outlet port 112. The chamber disk 1060 can also include one or more flow restriction holes 144 that permit fluid flow from the outlet port 112 back into the variable volume chamber 116 (that is, behind the spring-biased piston 120).

Additionally, the chamber disk 1060 can include an aperture 1062 sized to permit the spring-biased piston 120 to freely slide through the aperture 1062 (without permitting fluid flow through the aperture 1062). More specifically, the spring-biased piston 120 can include a piston 122 and a spring 123. The piston 122 can move back and forth through the variable volume chamber 116 and can extend through the chamber disk 1060 (that is, through the aperture 1062) into the outlet port 112. Also, a stopper 1064 positioned within the outlet port 112 can be coupled to an end of the piston 122.

Figure 17:
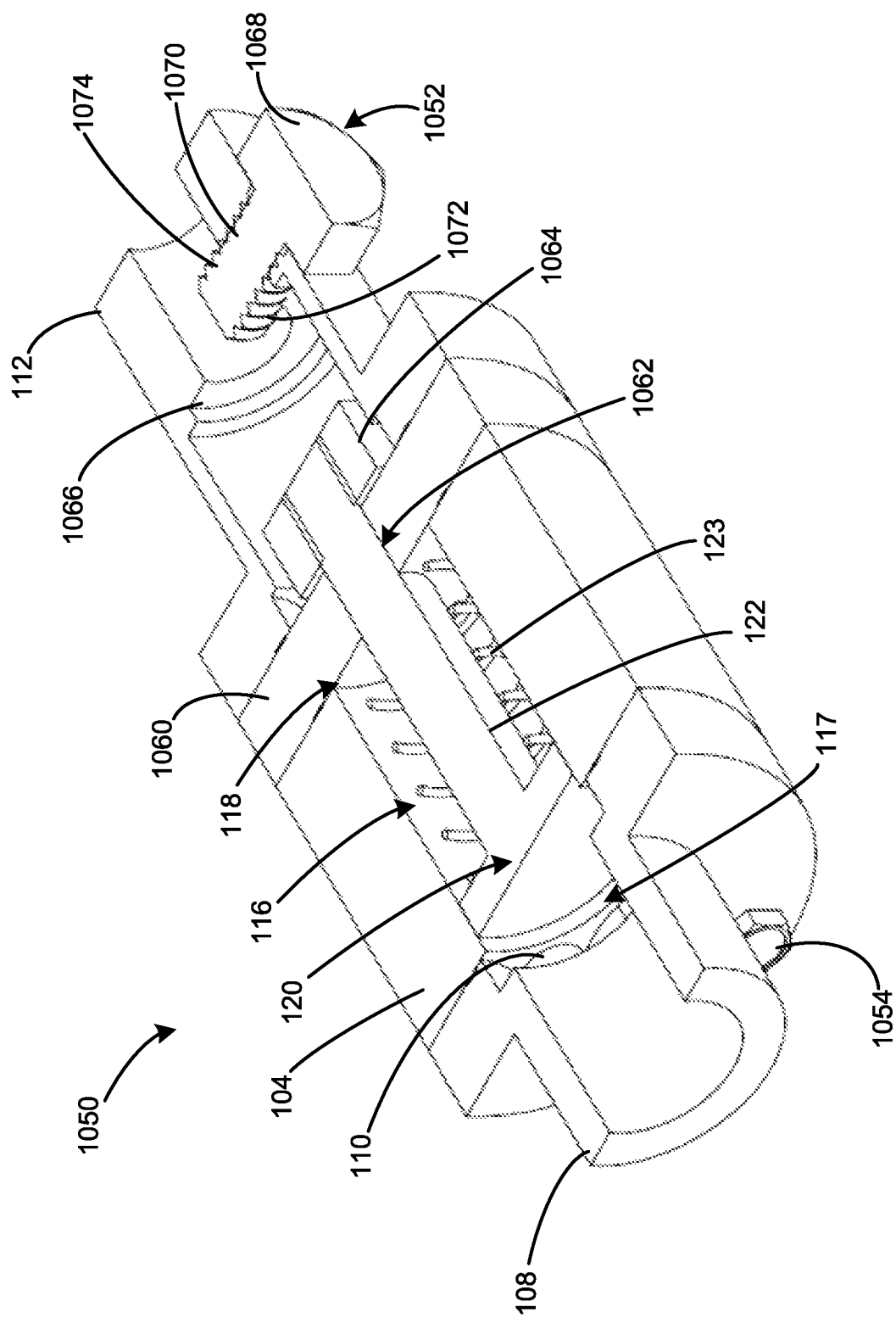
FIG. 17 depicts a cross-sectional view of the automatic shut-off device of FIG. 15 in an on position.

In operation, the spring-biased piston 120 can move between an "on" or resting state that permits fluid flow through the outlet port 112, as shown in FIG. 17, and an "off" or blocking state that blocks fluid flow through the outlet port 112, as shown in FIGS. 18 and 19. In the resting state, the force of the spring 123 against the backside of the piston 122 and/or fluid pressure from back-flow through the flow restriction holes 144 against the backside of the piston 122 can cause the piston 122 to rest near the open end 117 of the variable volume chamber 116. As a result of the piston's position, the outlet port 112 is unobstructed and fluid can fluid can freely flow from the inlet port 108, through the fluid passages 110, 1058, and out the outlet port 112.

Fluid flow into the inlet port 108 also pushes against the front of the piston 122, counteracting the spring forces and opposing fluid forces, forcing the piston 122 toward the outlet port 112. During normal flow, such as a toilet flush, the flow rate and time period of flow (that is, the total volume of fluid moving through the device 1050 over the flushing time) does not provide enough force to move the piston 120 into the blocking state. However, when flow is substantially constant over a predetermined time period, for example, during a slow leak in a fluid line downstream from the device 1050, the fluid accumulating at the open end 117 of the variable volume chamber 116 creates enough pressure to overcome the spring and opposing fluid forces, thus compressing the spring 123 and forcing the spring-biased piston 120 into the blocking state. As shown in FIGS. 18 and 19, while in the blocking state, the piston 122 has moved through the variable volume chamber 116 so that the stopper 1064 rests on a shoulder 1066 of the outlet port 112. As a result, as shown in FIG. 18, fluid can flow through fluid passages 110, 1058 into the outlet port 112, but the stopper 1064 blocks the fluid from exiting the outlet port 112.

The spring-biased piston 120 can be reset back to the resting state in a number of ways, thus again allowing fluid to flow freely through the outlet port 112. First, a change in flow rate can cause additional fluid flowing into the fluid passages 110, 1058 to back-flow through the flow restriction holes 144 and into the variable volume chamber 116. These additional back-flow forces can help push the piston 122 back toward the open end 117 and into the resting state. Second, a user can manually turn the pressure release screw 1052 to disengage the stopper 1064 off the shoulder 1066. More specifically, as shown in FIG. 19, the pressure release screw 1052 can include a screw head 1068 and a screw body 1070. The screw body 1070 can include a first, curved half 1072 with threading, and a second, flat half 1074. When the screw head 1068 is turned (e.g., by a user) so that the flat half 1074 faces the stopper 1064 and the piston 122, the stopper 1064 is allowed to rest on the shoulder 1066. When the screw head 1068 is turned further, the curved half 1072 contacts and pushes the stopper 1064 and/or piston 122 away from the shoulder 1066, thus breaking the seal formed between the stopper 1064 and the shoulder 1066. The pressure-release screw 1052, by breaking that seal, provides enough relief so that the counteracting spring and back-flow forces can overcome the fluid pressure at the open end 117 of the variable volume chamber 116, thus forcing the spring-biased piston 120 back into the resting state.

As discussed above, the device 1050 can switch from the resting state to the blocking state after a predetermined time period of substantially constant flow. The predetermined time period can be influenced by a number of factors, including at least the variable volume chamber volume, the spring 123, the total travel distance of the piston 122, and the size of the flow restriction hole(s) 144. For example, the size and/or amount of flow restriction holes 144 affects the amount of fluid over time that can enter and exit the closed end 117 of the variable volume chamber 116. Smaller or less flow restriction holes 144 create larger fluid pressure forces behind the piston 122. More flow into the open end 117 is then required to counteract such forces, thus increasing the predetermined time period of substantially constant flow necessary to trigger the blocking state. Larger or more flow restriction holes 144 create less fluid pressure forces behind the piston 122. Less flow into the open end 117 is then required to counteract such forces, thus decreasing the predetermined time period necessary to trigger the blocking state. In some embodiments, the device 1050 can include a rod (similar to the rod 1010 shown in FIG. 14) configured to move through the chamber disk 1060 and selectively cover one or more flow restriction holes 144, thus permitting manual adjustment of the predetermined time period.

Additionally, in some embodiments, the chamber disk 1060 can include a one-way valve, similar to the one-way valve shown in FIGS. 7 and 8, positioned so that fluid can flow through the one-way valve into the variable volume chamber 116, but not out of the variable volume chamber 116. The one-way valve can increase fluid back-pressure (by allowing more fluid into the variable volume chamber 116, with the only exit being the flow restriction holes 144. As a result, the one-way valve can permit quicker resetting of the piston 120 from the blocking state when flow rate through the device 1050 changes.

As discussed above, embodiments of the invention provide an automatic shut-off device that permits normal periods of fluid flow through a pressurized supply line, e.g., for a home or other residential or commercial building. When fluid flow is substantially constant for a predetermined time period, such as during a slow leak in the line, the device is triggered into an "off" or blocking state, stopping flow to the leak. The device can be reset manually (by resetting a valve or adjusting a pressure release screw) or automatically (upon changes in flow rate through the device).

The invention claimed is:

1. An automatic shut-off device comprising:
a housing member with a hollow opening;
an inlet port coupled to a first end of the housing member;
an outlet port coupled to a second end of the housing member;
a variable volume chamber within the housing member with an open end facing the inlet port of the housing member and a closed end facing the outlet port of the housing member;
wherein:
the closed end comprises at least one flow restriction hole;
a spring-biased piston movable within the variable volume chamber and comprising a compressible spring and a piston;
wherein:
the piston extends through the closed end of the variable volume chamber into the outlet port,
the piston is movable between a resting position that allows fluid through the outlet port and a blocking position that blocks fluid from leaving the outlet port, the piston is held in the resting position by the pressure of the fluid in the closed end of the variable volume chamber,
the piston is configured to move to the blocking position when substantially constant fluid flow through the device causes the pressure of the fluid in the open end of the variable volume chamber to be substantially greater than the pressure of the fluid in the closed end of the variable volume chamber for a predetermined period of time,
the piston is configured to move to the resting position when a change in fluid flow rate causes additional fluid to flow through the flow restriction holes and into the variable volume chamber, wherein the change in fluid flow rate causes the resulting pressure to push against the backside of the piston; and
a fluid passage within the housing member and separate from the variable volume chamber, wherein fluid flows from the inlet port both into the open end of the variable volume chamber against the piston and into the fluid passage toward the outlet port.

2. The automatic shut-off device of claim 1 and further comprising a pressure release screw in the outlet port, the pressure release screw being configured to disengage the piston from the blocking position back toward the resting position.

3. The automatic shut-off device of claim 1, wherein the flow restriction hole includes a plurality of flow restriction holes, and further comprising a rod configured to selectively block each of the plurality of flow restriction holes and adjust the predetermined period of time.

4. The automatic shut-off device of claim 1, further comprising a one-way valve disposed in the closed end of the variable volume chamber, wherein the one-way valve permits fluid into the variable volume chamber from the closed end and blocks fluid from leaving the closed end of the variable volume chamber through the one-way valve.

5. The automatic shut-off device of claim 1, further comprising a stopper coupled to an end of the piston, the stopper configured to block fluid from leaving outlet port when the piston is in the blocking position.

6. The automatic shut-off device of claim 1, further comprising a filter disposed within the variable volume chamber.

7. The automatic shut-off device of claim 1, further comprising at least one sealing ring disposed within the housing member.

8. The automatic shut-off device of claim 1, wherein the second end of the housing member includes a chamber disk, the chamber disk forming the closed end of the variable volume chamber.

9. The automatic shut-off device of claim 1, wherein the compressible spring is configured to return the piston to the resting state when the fluid pressure in the inlet port is substantially equal to the fluid pressure in the outlet port.

10. An automatic shut-off device comprising:
a housing member having a variable volume chamber and a fluid passage separate from the variable volume chamber, the variable volume chamber including an open end and an opposite closed end with a flow restriction hole;
an inlet port coupled to a first end of the housing member upstream from the open end and the fluid passage;
an outlet port coupled to a second end of the housing member downstream from the closed end and the fluid passage,
wherein fluid flow entering the inlet port flows into the open end and the fluid passage, and fluid flow through the fluid passage enters the outlet port; and
a spring-biased piston within the variable volume chamber comprising a compressible spring and a piston extending through the closed end, wherein fluid flow into the open end presses against a front side of the piston, and fluid flow into the outlet port backflows through the flow restriction hole and presses against a back side of the piston.

11. The automatic shut-off device of claim 10, wherein the piston is movable between a resting state that allows fluid through the outlet port and a blocking state that blocks fluid from leaving the outlet port.

12. The automatic shut-off device of claim 11, wherein the piston is moved to the blocking state after a predetermined period of time of substantially constant flow through the device.

13. The automatic shut-off device of claim 12, wherein the flow restriction hole includes a plurality of flow restriction holes, and further comprising a rod configured to selectively block each of the plurality of flow restriction holes and adjust the predetermined period of time.

14. The automatic shut-off device of claim 11 and further comprising a stopper coupled to the piston and positioned within the outlet port, wherein the piston forces the stopper to block fluid from exiting the outlet port in the blocking state.

15. The automatic shut-off device of claim 14, and further comprising a pressure release screw configured to selectively move between preventing the stopper from blocking fluid flow exiting the outlet port and permitting the stopper to block fluid flow exiting the outlet port.

16. The automatic shut-off device of claim 10, wherein the compressible spring is positioned within the variable volume chamber to press against the back side of the piston.

* * * * *